Patented Nov. 26, 1929

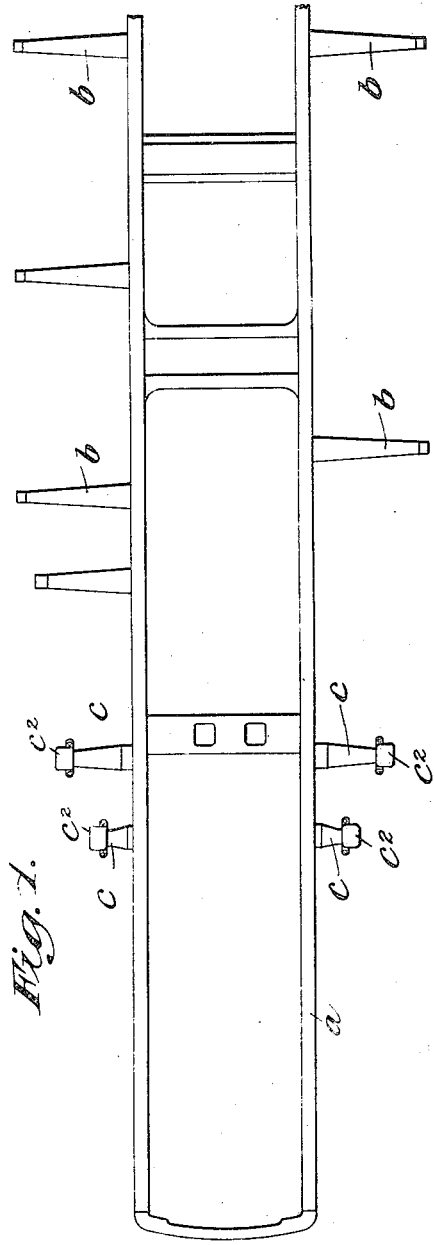
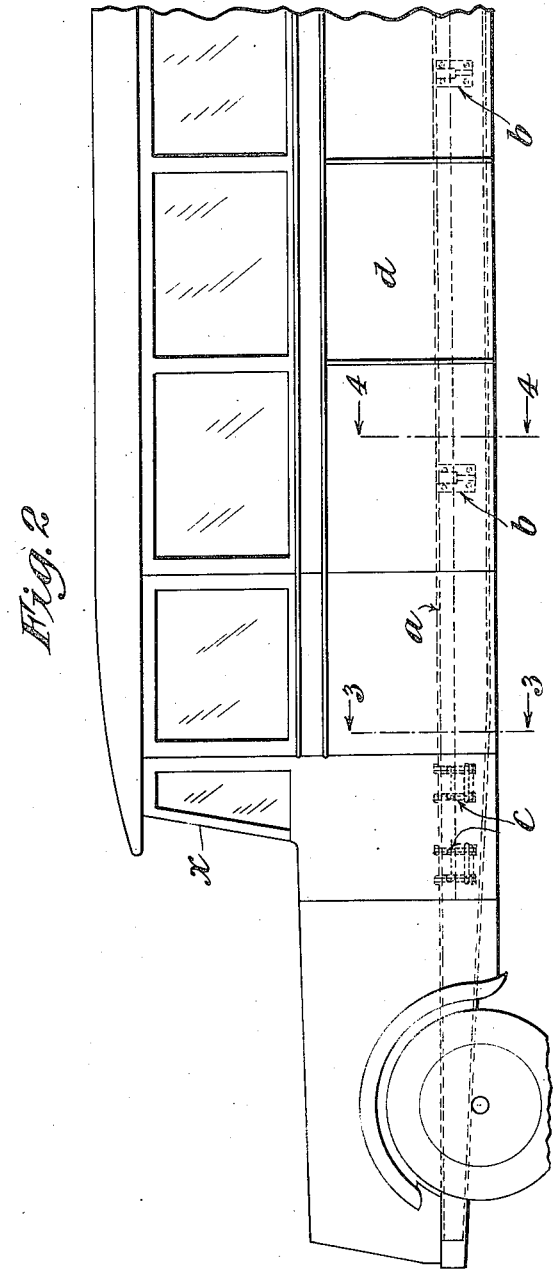

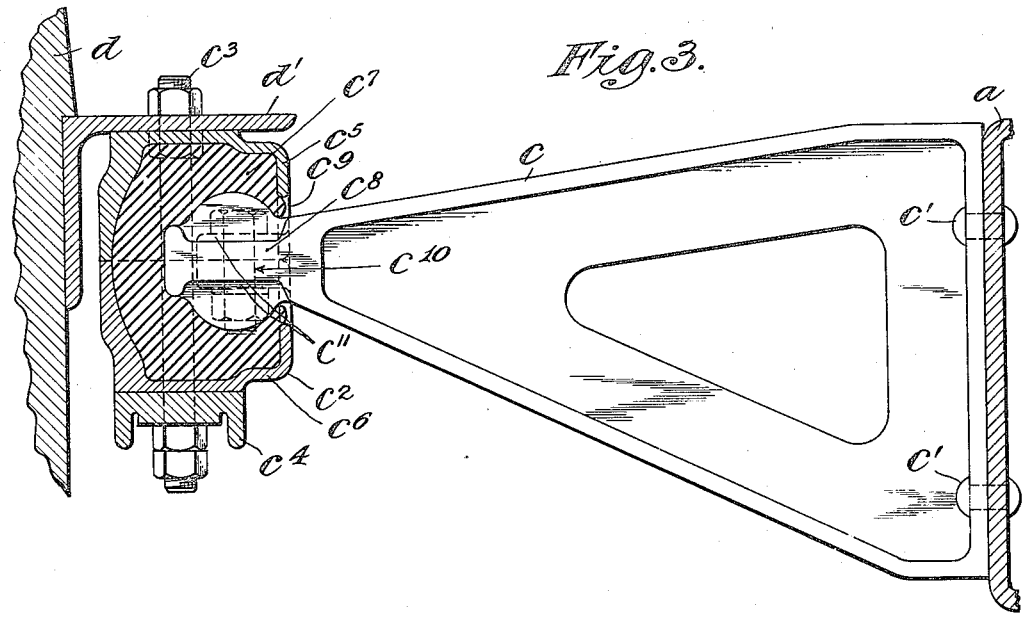
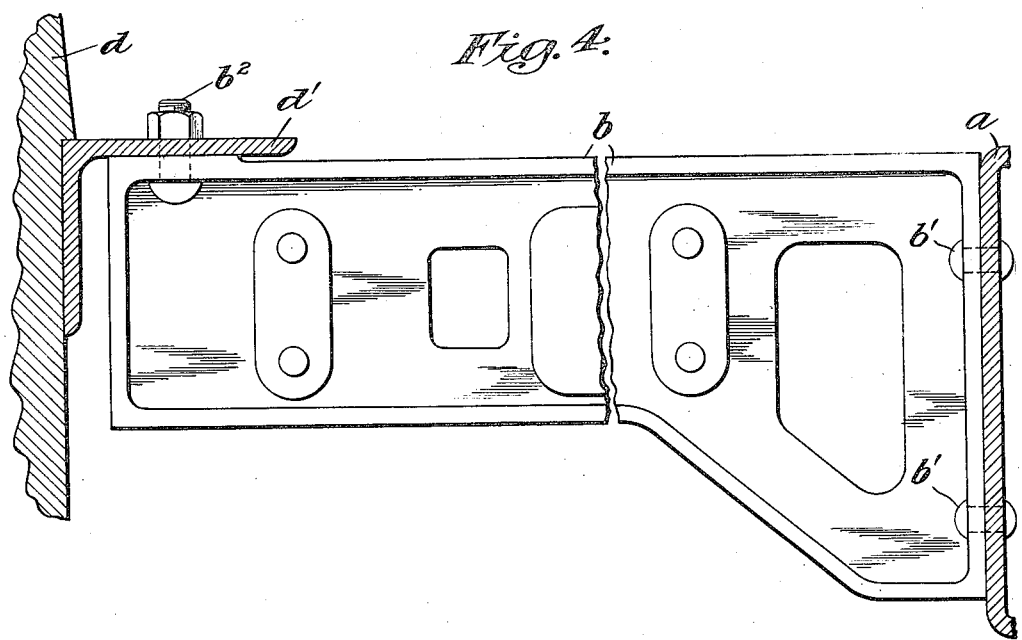

1,737,177

UNITED STATES PATENT OFFICE

GORDON M. SCHANTZ, OF ALLENTOWN, PENNSYLVANIA, ASSIGNOR TO INTERNATIONAL MOTOR COMPANY, OF NEW YORK, N. Y., A CORPORATION OF DELAWARE

MOUNTING FOR BUS BODIES

Application filed January 24, 1928. Serial No. 249,021.

This invention relates to means for mounting the body of a motor vehicle on the chassis frame thereof. When a motor vehicle is traveling over an irregular roadbed the chassis frame weaves and tends to accommodate itself to the uneven position of the wheels of the vehicle so that there are displacements between the chassis frame and the relatively inflexible body mounted thereon. This is particularly true in the case of motor vehicle buses in which the chassis frame is of great length. Such displacements tend to set up strains in various parts of the body which, if not yieldingly resisted, are often the cause for the breakage of fragile elements in the body, such as windshields, etc. It is therefore the object of this invention to provide means between the chassis frame and body of a motor vehicle such that undue strains will not be transmitted from the vehicle to the body and thus prevent the breakage of fragile elements mounted thereon. It is proposed to mount the body of the vehicle upon outrigger arms which are carried with the chassis frame at intervals along its length and to provide cushioning means of yielding non-metallic material for the ends of the arms which support that part of the body in which the windshield is mounted so that the windshield will be relieved of shocks and strains which would ordinarily be impressed upon it by the weaving of the chassis frame.

For a complete understanding of the invention reference should be had to the following detailed description thereof and to the accompanying drawings, in which:

Figure 1 is a plan view of a portion of a chassis frame showing the outrigger arms carried therewith.

Figure 2 is a view in side elevation showing a motor vehicle bus body mounted on the chassis frame.

Figure 3 is a view taken in a plane indicated by the line 3—3 in Figure 2 and looking in the direction of the arrows and showing the manner of mounting the outrigger arms in the neighborhood of the windshield.

Figure 4 is a view taken in a plane indicated by the line 4—4 in Figure 2 and showing an outrigger arm to which the body is rigidly attached.

The chassis frame $a$ of the vehicle is provided with a series of laterally extending outrigger arms $b$ and $c$ which are rigidly connected to the chassis frame as by means of the rivets $b'$ and $c'$. The outriggers $b$, upon which that portion of the vehicle body $d$ rearward of the windshield $x$ is to be mounted, are adapted at their ends to have the body sill $d'$ rigidly fastened thereto by means of bolts $b^2$ but below that portion of the body with which the windshield $x$ is carried, housings $c^2$ are provided each of which is attached to the body sill $d'$ by means of bolt $c^3$ and a plate $c^4$. Each housing comprises an upper portion $c^5$ and a lower portion $c^6$ between which is confined a block $c^7$ of yielding non-metallic material, such as rubber. The end $c^8$ of the arm $c$ extends through an opening $c^9$ in the housing and is confined within the yielding non-metallic material $c^7$. The two parts of the housings may be held together by bolt $c^3$ or by means of bolts $c^{10}$ and flanges $c^{11}$ whereby the yielding non-metallic material may be placed under a degree of initial compression.

It will be seen that the yielding non-metallic material $c^7$ yieldingly cushions and absorbs shocks and strains which would otherwise be transmitted to that portion of the body in which the windshield is mounted and thus overcomes the possibility of breakage of the windshield on account of the weaving of the frame. Such a body mounting also improves the riding qualities of the vehicle inasmuch as the body is relieved of the necessity of following too closely the weaving of the chassis frame in passing over irregularities in the road.

Obviously, the outriggers or supporting arms $b$ and $c$ could be mounted upon the body and extend inwardly to be engaged in the housings which would be carried by the frame. This construction would simply be a reversal of parts and the invention would be equally applicable to each construction.

No limitation upon the scope of the invention is intended, except as indicated in the following claims.

I claim as my invention:

1. In a motor vehicle, a frame element, a body element, laterally extending supporting arms on each side of the vehicle rigidly carried with one of the elements, rigid connections between the other element and at least two of said supporting arms on each side of the vehicle, and means to fasten positively but non-rigidly the last named element to the remainder of said supporting arms, comprising yielding non-metallic material operatively interposed therebetween to absorb and cushion shocks and stresses transmitted between the chassis frame and the body.

2. In a motor vehicle having a frame element and a body element having a portion adapted to partake of a degree of movement in a certain direction with respect to the remainder thereof, laterally extending supporting arms on each side of the vehicle rigidly carried with one of the elements, rigid connections between the other element and at least two of the said supporting arms on each side of the vehicle, and means to fasten the last named element to the remainder of said supporting arms to absorb and cushion shocks and strains transmitted between the chassis and body, said means comprising housing carried with the last named element, and blocks of yielding non-metallic material confined in said housings, the ends of the respective supporting arms extending into the housing and being confined within and surrounded by the yielding non-metallic material, whereby shocks in the aforesaid direction are cushioned.

This specification signed this 21st day of January, A. D. 1928.

GORDON M. SCHANTZ.